US009339754B2

(12) United States Patent
Davidian

(10) Patent No.: US 9,339,754 B2
(45) Date of Patent: May 17, 2016

(54) ADSORBER INCLUDING PARALLEL-PASSAGE CONTACTORS HAVING BUILT-IN INSULATION

(75) Inventor: Benoit Davidian, Saint Mauer des Fosses (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 114 days.

(21) Appl. No.: 14/114,806

(22) PCT Filed: Apr. 20, 2012

(86) PCT No.: PCT/FR2012/050859
§ 371 (c)(1),
(2), (4) Date: Oct. 30, 2013

(87) PCT Pub. No.: WO2012/172219
PCT Pub. Date: Dec. 20, 2012

(65) Prior Publication Data
US 2014/0083293 A1    Mar. 27, 2014

(30) Foreign Application Priority Data
May 3, 2011    (FR) ...................... 11 53756

(51) Int. Cl.
  *B01D 53/04*    (2006.01)
  *B01D 53/047*    (2006.01)

(52) U.S. Cl.
  CPC .......... *B01D 53/0407* (2013.01); *B01D 53/047* (2013.01); *B01D 53/0423* (2013.01); *B01D 53/0462* (2013.01); *B01D 2257/302* (2013.01);
  (Continued)

(58) Field of Classification Search
  CPC ............. B01D 53/047; B01D 53/0462; B01D 53/0423; B01D 53/0407; B01D 2257/302; B01D 2257/404; B01D 2257/50; B01D 2257/702; B01D 2257/80
  USPC ........ 95/96, 117, 129, 137, 139, 143; 96/108, 96/121, 139, 152
  See application file for complete search history.

(56) References Cited

U.S. PATENT DOCUMENTS 2,038,071 A  *  4/1936  Wilhelm ........................ 96/118
2,995,208 A     8/1961  Hachmuth et al.
(Continued)

FOREIGN PATENT DOCUMENTS

DE    8812817    12/1988
DE    19814132    10/1999
(Continued)

OTHER PUBLICATIONS

FR1153756, French Search Report and Written Opinion, Dec. 12, 2011.
(Continued)

*Primary Examiner* — Frank Lawrence
(74) *Attorney, Agent, or Firm* — Elwood L. Haynes

(57) ABSTRACT

Adsorber for adsorbing a fluid, comprising a cylinder with at least two parallel-passage contactors disposed in series in the direction of flow of the fluid to be adsorbed, and characterized in that each contactor comprises an internal insulation.

9 Claims, 2 Drawing Sheets

(52) U.S. Cl.
CPC ....... *B01D 2257/404* (2013.01); *B01D 2257/50* (2013.01); *B01D 2257/702* (2013.01); *B01D 2257/80* (2013.01)

(56) References Cited

U.S. PATENT DOCUMENTS

| | | | |
|---|---|---|---|
| 4,386,947 A * | 6/1983 | Mizuno et al. | 96/137 |
| 4,568,402 A | 2/1986 | Ogawa et al. | |
| 5,260,035 A * | 11/1993 | Lachman et al. | 422/180 |
| 5,750,026 A * | 5/1998 | Gadkaree et al. | 210/502.1 |
| 2003/0108457 A1 | 6/2003 | Gault et al. | |
| 2005/0081717 A1* | 4/2005 | Meiller et al. | 96/154 |
| 2007/0261557 A1* | 11/2007 | Gadkaree et al. | 96/121 |
| 2008/0314244 A1 | 12/2008 | Kelley et al. | |
| 2009/0241512 A1 | 10/2009 | Wirth | |
| 2011/0031103 A1* | 2/2011 | Deckman et al. | 203/41 |

FOREIGN PATENT DOCUMENTS

| | | |
|---|---|---|
| EP | 0153157 | 8/1985 |
| EP | 0850686 | 12/2004 |
| EP | 1491248 | 12/2004 |
| EP | 1580181 | 9/2005 |
| EP | 2301907 | 3/2011 |
| WO | 2009020693 | 2/2009 |
| WO | 2010081809 | 7/2010 |

OTHER PUBLICATIONS

PCT/FR2012/050859, International Search Report, Jul. 5, 2012.

* cited by examiner

ADSORBER INCLUDING PARALLEL-PASSAGE CONTACTORS HAVING BUILT-IN INSULATION

CROSS REFERENCE TO RELATED APPLICATIONS

This application is a 371 of International PCT Application PCT/FR2012/050859, filed Apr. 20, 2012, which claims priority to French Application 1153756, filed May 3, 2011, the entire contents of which are incorporated herein by reference.

BACKGROUND

The invention relates to the insulation of an adsorber comprising several parallel-passage contactors and to the use of this same adsorber.

Adsorption is a physical phenomenon that is being used more and more industrially for separating or purifying gaseous flows.

For example, adsorption is used conventionally to dry various gaseous flows, in particular air or natural gas for producing hydrogen, for producing oxygen and/or nitrogen from atmospheric air, and for capturing numerous constituents of various effluents before use thereof in a downstream method or venting thereof as VOCs, nitrogen oxides, mercury, etc.

The methods used are either of the lost load type or regeneratable. The regeneration takes place either by pressure reduction or by temperature increase. It is also possible to couple these two effects. PSA (pressure swing adsorption), TSA (temperature swing adsorption) and PTSA (pressure temperature swing adsorption) are spoken of respectively.

When the regeneration of a PSA takes place under vacuum, the abbreviation VSA (vacuum swing adsorption) is generally used.

The present invention concerns in particular TSAs.

The adsorbent used is generally in the form of particles with which an adsorber is filled. These particles may be in the form of granules, sticks, balls or crushed material. The characteristic dimensions of these particles generally range from 0.5 mm to 5 mm.

The smallest particles improve the absorption kinetics and thereby the efficacy of the method but on the other hand they create significant pressure drops on the fluid phase.

Conventional axial cylinders of adsorbents in the form of balls (ascending or descending circulation of fluid) use thermal insulation between the beds of balls and the surrounding environment.

On a small cylinder, typically with a diameter of less than 2 m, use is made rather of external insulation attached to the external barrel of the cylinder, of the glass wool or cellular glass or polyurethane foam insulation type: this insulation is not very effective since in the phase of regeneration heating of the cylinder, some of the thermal energy is used to heat the metal of the cylinder, requiring compensating for the heat loss in oversizing the regeneration rate.

On a large cylinder, typically with a diameter greater than 2 m, internal insulation is used: this must mechanically be able to contain the beds of balls of adsorbents, not promoting the creation of a preferential gas passage (outside the bed of adsorbents), and be able to withstand any compression/decompression cycles between adsorption and regeneration. Conventionally use is made of a system of single or double layers of gas that serve as an insulating cushion, since the layer of air remains immobile. These layers, relatively efficient in terms of insulation, are difficult to implement and are relatively expensive.

Starting from there, one problem that is posed is providing adsorbents having better insulation, for functioning in TSA.

SUMMARY

One solution of the invention is an adsorber for adsorbing a fluid, comprising a cylinder with at least two parallel-passage contactors placed in series in the direction of flow of the fluid to be adsorbed, and characterised in that each contactor comprises internal insulation.

"Internal insulation" means insulation that is particular to each parallel-passage contactor; in other words integrated in each contactor.

Parallel-passage contactor means a device in which the fluid passes through channels the walls of which contain adsorbent. The fluid flows in channels essentially free from obstacles, these channels enabling the fluid to flow from an inlet to an outlet of the contactor. These channels may be rectilinear, directly connecting the inlet to the outlet of the contactor, or have changes in direction. During its flow, the fluid is in contact with at least one adsorbent present at said walls.

The solution according to the invention affords the following advantages:

Ease of implementation, since it is integrated in the parallel-passage contactors: the insulation is installed at the same time as the contactors are placed in the adsorber.
Insulation of the internal type, equivalent to a multitude of immobile layers of air: very good thermal insulation performance, making it possible either to reduce its size for equivalent performance, or to increase the thermal performance for equivalent size.
Inexpensive.

Moreover, parallel-passage contactors mean fewer pressure drops, which makes it possible, for equivalent pressure drops, to reduce the diameter of the adsorber, optionally increasing its height.

According to circumstances, the parallel-passage contactors of the adsorber according to the invention may comprise one or other of the following internal insulations.

According to a first alternative, the internal insulation of each of the contactors comprises:
a double sealed barrelling fixed over the whole of the height of the contactor, and
an insulator introduced into the space formed by the double barrelling.

Sealed means "preventing the creation of a preferential gas passage outside the parallel-passage contactor".

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

The insulator is preferentially chosen from perlite, glass wool, rock wool, cellular glass, vacuum, aerogel, multilayer insulator or any other insulator or combination of insulators conventionally used, etc.

Moreover, this first alternative may be supplemented by sealing elements fixed to the external barrel of the double barrelling facing the internal barrel of the cylinder. The sealing elements are preferably chosen from brushes, gaskets, welds or welded elements, glue or glued elements and preferably sized so as to mitigate any differential expansion between the barrel of the adsorber and the double barrelling of the parallel-passage contactors during the regeneration of the adsorber.

According to a second alternative, each parallel-passage contactor has channels and the channels are at least partially obstructed over a centripetal radial distance of 20 cm, preferentially 10 cm, even more preferentially 5 cm, starting from the external perimeter of the parallel-passage contactor.

This obstruction prevents the creation of a preferential gas passage in the channels concerned.

It should be noted that, in this second alternative, the parallel-passage contactors may optionally have a barrel. Consequently, "external perimeter" means the edge of the parallel-passage contactor or the edge of the barrel of the parallel-passage contactor.

To achieve the obstruction of the channels:
the channels that have to be partly obstructed are, over at least part of the length thereof, filled in with resin, mastic, silicone or any element that can be applied in liquid or viscous form in order to durably block the channels concerned; and/or
at least one of the ends of the channels having to be partly obstructed is obstructed by a metal plate, or a plastic plate, or a silicone or rubber gasket, or any solid element that can be placed or fixed.

The obstruction can be done at the top, at the bottom, or at part of each channel concerned. It can be envisaged blocking the whole of the length of each channel concerned.

Figure 1:
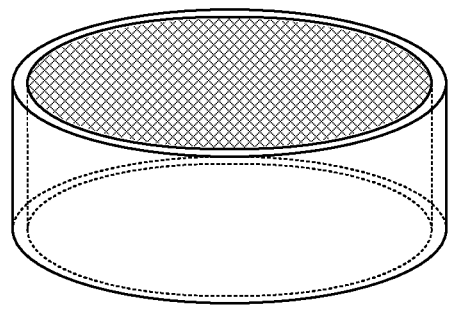
FIG. 1 shows a parallel-passage contactor with double barreling.
Figure 2:
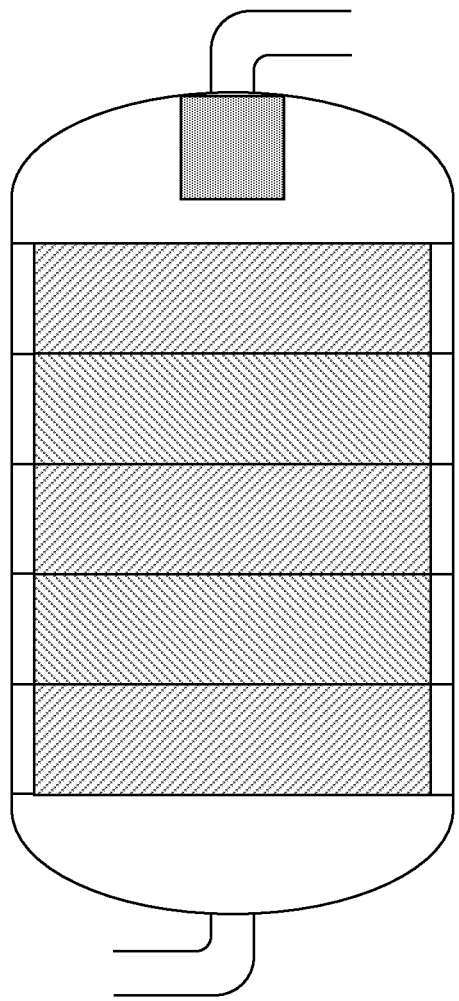
FIG. 2 shows an adsorber according to the invention comprising a series of parallel-passage contactors with double barreling.
Figure 3:
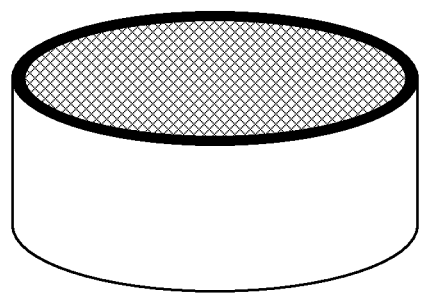
FIG. 3 shows a parallel-passage contactor with a metal plate at the top ends of the channels that are to be obstructed.

FIG. 3 shows a parallel-passage contactor with a metal plate at the top ends of the channels that are to be obstructed.

Figure 4:
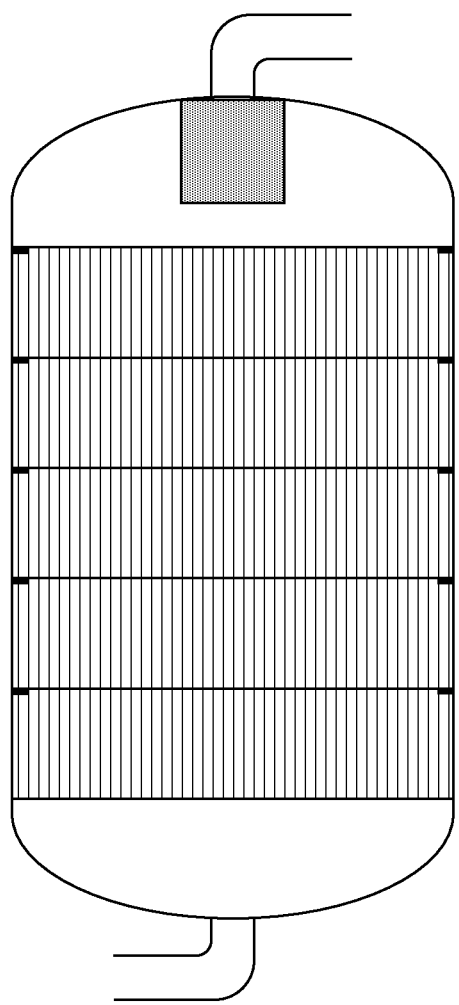
FIG. 4 shows an adsorber according to the invention comprising a series of parallel-passage contactors with a metal plate at the top ends of the channels that are to be obstructed.

FIG. 4 shows an adsorber according to the invention comprising a series of parallel-passage contactors with a metal plate at the top ends of the channels that are to be obstructed.

In this second alternative, obstruction of the channels makes it possible to block the circulation of the fluid in these channels and to create an insulation like miniscule layers of gas. The immobile gas cells being much smaller than the conventional layers of gas, an appreciably more efficient thermal insulation is obtained. Alternatively, for an equivalent thermal insulation performance, it is possible to greatly reduce the thickness of the insulation.

Moreover, this second alternative can be supplemented by sealing elements fixed to the external face of the parallel-passage contactors facing the internal barrel of the cylinder. The sealing elements are preferably chosen from brushes, gaskets, welds or welding elements, glue or glued elements and preferably sized so as to mitigate any differential expansion between the barrel of the adsorber and the external periphery of the parallel-passage contactors during the regeneration of the adsorber.

The adsorbents able to be used in parallel-passage contactors are those used in conventional gaseous flow purification or separation units. The choice depends on the application. It is possible in the same contactor to use successively several different adsorbents. Silica gels, activated alumina, optionally doped, active carbons, zeolites of various types (3A, 4A, 5A, type X, LSX, Y etc., optionally exchanged, etc.) can be cited. The zeolites are generally used in the form of microcrystals or even nanocrystals, depending on the synthesis methods. Other adsorbents, for example active carbons, can be crushed in order to obtain particles of around 1 micron.

The contactors may be identical or on the other hand it is possible to use this invention to singularise at least one contactor and adapt it to the operating conditions situated at this level of the adsorber. Concerning this modification, it may a case of another type of adsorbent, a modification to the thickness of the adsorbent layer, the cross section of flow, etc.

The device according to the invention may be used in various methods such as TSAs, PTSAs etc. It may also be used to dry, decarbonate or stop secondary impurities in a gaseous flow, in particular issuing from atmospheric air. Secondary impurities means traces of hydrocarbons, NOx, SOx, etc.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. An adsorber for adsorbing a fluid, comprising a cylinder with at least two parallel-passage contactors disposed in series in the direction of flow of the fluid to be adsorbed, and wherein each contactor comprises an internal insulation, each parallel-passage contactor comprising channels and the channels being at least partly obstructed over a centripetal radial distance of 20 cm starting from the external perimeter of the parallel-passage contactor, and the fluid flowing through the remaining channels that are essentially free of obstruction.

2. The adsorber of claim 1, wherein the partly obstructed channels are filled in, over at least part of the length thereof, by a liquid or a paste.

3. The adsorber of claim 1, wherein at least one of the ends of the partially obstructed channels is obstructed by a solid element placed or fixed.

4. The adsorber of claim 1, wherein said adsorber comprises sealing elements fixed to the external face of the parallel-passage contactors facing an internal barrel of the cylinder.

5. The adsorber of claim 4, wherein sealing elements are chosen from brushes, gaskets, welds, welded elements, glue or glued elements.

6. The adsorber of claim 4, wherein the sealing elements are sized so as to mitigate the differential expansion between the internal barrel of the cylinder and the external perimeter of the parallel-passage contactors when the adsorber is regenerated.

7. Use of the absorber of claim 1 for drying, decarbonating or stopping secondary impurities in a gaseous flow.

8. Use of the adsorber of claim 1, for capturing NOx, SOx or traces of hydrocarbons contained in a gaseous flow.

9. Use of the adsorber of claim 1 in a TSA or PTSA cycle.

* * * * *